UNITED STATES PATENT OFFICE.

DANIEL TYRER, OF STOCKTON-ON-TEES, ENGLAND.

MANUFACTURE OF SODIUM PERMANGANATE.

1,368,076.  Specification of Letters Patent.  Patented Feb. 8, 1921.

No Drawing.  Application filed September 29, 1919. Serial No. 327,257.

*To all whom it may concern:*

Be it known that I, DANIEL TYRER, a subject of the King of Great Britain, residing in Stockton-on-Tees, England, have invented certain new and useful Improvements in the Manufacture of Sodium Permanganate, of which the following is a specification.

A known process of making sodium permanganate consists in first preparing barium manganate, then converting this into the permanganate, then decomposing the barium permanganate with sodium carbonate or sulfate and finally crystallizing the solution of sodium permanganate thus obtained.

There is difficulty in satisfactorily converting the barium manganate into the permanganate; the desired change is expressed by the equation:

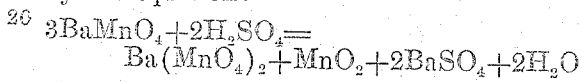

$$3BaMnO_4 + 2H_2SO_4 = Ba(MnO_4)_2 + MnO_2 + 2BaSO_4 + 2H_2O$$

but the conversion is not complete.

Another difficulty in the process is the isolation of the sodium permanganate by crystallization because it separates in the form of a sludge of fine crystals which can only with difficulty be separated from the mother liquor. Complete evaporation is also impracticable because of the danger of decomposing some of the product by over-heating.

My invention consists in a process wherein these difficulties are to a great extent eliminated.

A substantially complete conversion of the barium manganate into permanganate is brought about by adding the sulfuric acid to the suspension of the manganate in water, extremely slowly at first, with the effect, as I presume, that the first permanganate formed is decomposed by the sulfuric acid, liberating free permanganic acid so that the unchanged barium manganate is decomposed by the free permanganic acid. Another and better method of applying this principle is to add first to the barium manganate a solution of barium permanganate previously prepared and then sulfuric acid gradually, so that the free acid actually present in the liquor is permanganic and not sulfuric acid. When the reaction is complete any slight residual acidity may be neutralized by barium hydrate.

The barium permanganate solution is then converted into sodium permanganate solution in known manner and after filtration the last-named solution is ready for evaporation.

The invention in this part of the process depends upon the fact that sodium permanganate crystallizes with water of crystallization and that when heated the hydrated salt melts in its water of crystallization. It is, therefore, only necessary to evaporate the solution until, on cooling, it completely solidifies. When this degree of concentration has been attained the liquor is run into casting trays or molds in which, on cooling, it solidifies to a dry crystalline mass which has a composition approximating to $NaMnO_4.3H_2O$, but it may contain less water than that represented by this formula.

The following examples illustrate the invention:

Example 1: 100 kilos of barium manganate are suspended in 1000 to 1500 liters of water at ordinary temperature and 54 kilos of sulfuric acid of 50 per cent. strength are added at the rate of 100–500 c. c. per minute, the mixture being thoroughly stirred while the addition proceeds. After one-third of the acid has been added in this manner the rest may be introduced more rapidly. When the whole of the acid has been added, the stirring is continued for half-an-hour and then the liquor, if acid, is neutralized with barium hydrate. A solution of sodium sulfate of 20 per cent. strength is now introduced while stirring is maintained until the liquor contains no barium in solution. After a few minutes the solid matter is separated from the liquid in any known manner and the solution of sodium permanganate thus obtained is evaporated at about 100° C. until a sample solidifies on cooling. The whole is then allowed to cool and the mass broken up or ground.

When a high degree of purity of the finished product is not essential and the parent barium manganate has been made by adding barium hydrate to sodium manganate, the barium manganate may be left suspended in the solution of sodium hydroxid formed by the reaction and this suspension treated with sulfuric acid in suitably changed proportion, first to neutralize the alkali and then to react in the manner described in this example. The step of adding sodium sulfate may then be unnecessary, as will be readily understood by the chemist.

Example 2: 100 kilos of barium manganate are suspended in 1000 liters of water at ordinary temperature containing 10 kilos of barium permanganate and the addition of sulfuric acid conducted as described in Example 1 except that the rate of addition may be 3 to 4 times as rapid, thus saving time in the process. The rest of the operation is similar to that described in Example 1.

Having thus described the nature of the said invention and the best means I know of carrying the same into practical effect, I claim:—

1. In the manufacture of sodium permanganate from barium manganate, conducting the conversion of the latter into barium permanganate under such conditions that free permanganic acid is present during the addition of sulfuric acid, and evaporating the solution of sodium permanganate ultimately obtained until it solidifies on cooling.

2. In the manufacture of sodium permanganate from barium manganate as defined in claim 1, adding sulfuric acid to a suspension of barium manganate in the presence of barium permanganate.

In testimony whereof I have signed my name to this specification.

DANIEL TYRER.